US 6,575,084 B2

(12) United States Patent
Allen et al.

(10) Patent No.: US 6,575,084 B2
(45) Date of Patent: Jun. 10, 2003

(54) SYSTEM FOR, AND METHOD OF, IRRADIATING FOOD PRODUCTS

(75) Inventors: John Thomas Allen, San Diego, CA (US); Bengt E. Nyman, San Diego, CA (US); George Michael Sullivan, San Diego, CA (US); Colin Brian Williams, La Jolla, CA (US)

(73) Assignee: Surebeam Corporation, Inc., San Diego, CA (US)

( * ) Notice: Subject to any disclaimer, the term of this patent is extended or adjusted under 35 U.S.C. 154(b) by 82 days.

(21) Appl. No.: 09/872,131

(22) Filed: Jun. 1, 2001

(65) Prior Publication Data

US 2002/0182294 A1 Dec. 5, 2002

(51) Int. Cl.[7] .............................. A23L 1/00; A23L 3/00; A61L 2/00
(52) U.S. Cl. ......................... 99/451; 99/358; 99/443 C; 99/DIG. 14; 422/22; 422/24
(58) Field of Search ........................... 99/353–355, 451, 99/358, DIG. 14, 386, 443 C, 443 R; 426/237, 240, 320, 521, 442, 474; 422/22, 24, 28, 33, 269, 292, 306; 250/492.3, 455.11; 219/121.29, 121.12

(56) References Cited

U.S. PATENT DOCUMENTS

| 2,729,748 A | * | 1/1956 | Robinson ................. 250/492.3 |
| 4,776,267 A | * | 10/1988 | Harris ......................... 99/451 |
| 4,788,701 A | * | 11/1988 | Barrett .................... 250/492.3 |
| 4,974,503 A | * | 12/1990 | Koch .......................... 99/451 |
| 5,004,926 A | * | 4/1991 | Vassenaix et al. ........ 250/492.3 |
| 5,144,146 A | * | 9/1992 | Wekhof ................... 422/24 X |
| 5,200,158 A | * | 4/1993 | Jacob ....................... 422/22 X |
| 5,266,766 A | * | 11/1993 | Hecox ...................... 99/358 X |
| 5,553,532 A | * | 9/1996 | De La Luz-Martinez et al. .......................... 99/358 |
| 5,593,713 A | * | 1/1997 | De La Luz-Martinez et al. .......................... 426/237 |
| 5,603,972 A | * | 2/1997 | McFarland .................. 99/451 |
| 6,145,276 A | * | 11/2000 | Palm et al. .............. 422/24 X |
| 6,229,130 B1 | * | 5/2001 | Furuta et al. ............. 99/451 X |

* cited by examiner

Primary Examiner—Timothy F. Simone
(74) Attorney, Agent, or Firm—Fulwider Patton; Ellsworth R. Roston

(57) ABSTRACT

A continuously provided ground food product (e.g. meat) is leveled to a particular thickness and then irradiated. The leveler may be formed from two (2) spaced members (e.g., closed loop belts) spaced from each other by a distance progressively decreasing to a distance corresponding to the particular thickness. This distance may be adjustable to define any desired thickness for the food product. The leveler and the radiation source are disposed in a chamber providing shielding against radiation. The belt carrying the food product past the radiation source deposits the irradiated food product in a receptacle. A transport mechanism (e.g. auger) transports the irradiated food product, without exposing the food product to harmful bacteria, from the receptacle to a former which provides the food product in individual configurations (e.g. hamburgers, chubs and case ready) without exposing the product to harmful bacteria. The formed product is thereafter stored in an environment which excludes harmful bacteria. The belt carrying the food product may be reversed in direction when the radiation from the source is interrupted. The food products are then deposited in a second receptacle and are discarded.

32 Claims, 4 Drawing Sheets

SYSTEM FOR, AND METHOD OF, IRRADIATING FOOD PRODUCTS

BACKGROUND OF A PREFERRED EMBODIMENT OF THE INVENTION

This invention relates to systems for, and methods of, irradiating products, primarily food products, to destroy harmful bacteria. More particularly, the invention relates to systems for, and methods of, irradiating objects, primarily food products, before the formation of the products into particular configurations and then forming the irradiated products into the particular configurations (such as hamburgers, chubs and case ready when the food products constitute meat).

It has been known for some time that drugs and medical instruments and implements have to be sterilized so that they will not cause patients to become ill from harmful bacteria when they are applied to the patients. Systems have accordingly been provided for sterilizing drugs and medical instruments and implements. The drugs and the medical instruments and implements have then been stored in sterilized packages until they have been ready to be used.

In recent years, it has been discovered that foods can carry harmful bacteria if they are not processed properly or, even if they are processed properly, that the foods can harbor and foster the proliferation of such harmful bacteria if they are not stored properly or retained under proper environmental conditions such as temperature. Some of the harmful bacteria can even be deadly.

For example, harmful bacteria have been discovered in recent years in hamburgers prepared by one of the large hamburger chains. Such harmful bacteria have caused a number of purchasers of hamburgers at stores in the chain to become sick. As a result of this incident and several other similar incidents, it is now recommended that hamburgers should be cooked to at least a medium state rather than a medium rare or rare state. Similarly, harmful bacteria have been found to exist in many chickens that are sold to the public. As a result of a number of incidents which have recently occurred, it is now recommended that all chickens should be cooked until no blood is visible in the cooked chickens.

To prevent incidents such as discussed in the previous paragraphs from occurring, various industries have now started to irradiate before the foods are sold to the public. This is true, for example, of hamburgers and chickens. It is also true of fruits, particularly fruits which are imported into the United States from foreign countries.

In previous years, gamma rays have generally been the preferred medium for irradiating. The gamma rays have been obtained from a suitable material such as cobalt and have been directed to the articles to be irradiated. The use of gamma rays has resulted in certain disadvantages. One disadvantage is that irradiation by gamma rays is slow. Another disadvantage is that irradiation by gamma rays is not precise. This results in part from the fact that the strength of the source (e.g. cobalt) of the gamma rays decreases over a period of time and that the gamma rays cannot be directed in a sharp beam to the article to be irradiated. This prevents all of the gamma rays from being useful in irradiating the articles.

In recent years, electron beams have been directed to articles to irradiate the articles. Electron beams have certain advantages over the use of gamma rays to irradiate objects. One advantage is that irradiation by electron beams is fast. For example, a hamburger patty can be irradiated instantaneously by a passage of an electron beam of a particular intensity through the hamburger patty. Another advantage is that irradiation by an electron beam is relatively precise because the strength of the electron beam remains substantially constant even when the electron beam continues to be generated over a long period of time.

When irradiation by an electron beam is provided, the articles being irradiated move on a conveyor line past a source of radiation. The articles move on the conveyor line at a relatively high speed and in a closely spaced relationship. When the articles constitute meat, the articles are preformed into different configurations such as hamburger patties, chubs and case ready articles. At any one time, only articles of a particular configuration are disposed on the conveyor line. It is inefficient to operate in this manner since the parameters of the conveyor line have to be changed when the articles on the conveyor lines are changed from one configuration to another configuration. Alternatively, a first conveyor line has been provided to irradiate food items such as hamburger patties; a second conveyor line has been provided to irradiate food such as chubs (articles having a long cylindrical configuration); and a third conveyor line has been provided to irradiate food items such as case ready meat products. Separate conveyor lines are inefficient, slow and costly.

There is another disadvantage to the systems now in use, particularly systems for irradiating meat. This results from the fact that the meat has been irradiated after it is introduced to the equipment which forms the meat into packets. For example, the meat has been ground in order to be formed into hamburger patties or chubs. After being ground and being formed into such specialized configurations as hamburger patties or chubs, the meat has then been transported to the conveyor line in which items of that particular configuration are being irradiated. This is inefficient, slow and costly, particularly because of the separate spaces and equipment needed to process and grind the meat, thereafter form the meat into particular configurations and then irradiate the ground meat of the different configurations.

BRIEF DESCRIPTION OF PREFERRED EMBODIMENTS OF THE INVENTION

A ground food product (e.g. meat) is leveled to a particular thickness and then irradiated. The leveler may be formed from two (2) spaced members (e.g., closed loop belts) spaced from each other by a distance progressively decreasing to a distance corresponding to the particular thickness. This distance may be adjustable to define any particular thickness for the food product. The leveler and the radiation source are disposed in a chamber providing shielding against radiation. The belt carrying the food product past the radiation source deposits the irradiated food product in a receptacle.

A transport mechanism (e.g. auger) transports the irradiated food product, without exposing the food product to harmful bacteria, from the receptacle to a to a former which provides the food product into individual configurations (e.g. hamburgers, chubs and case ready) without exposing the food product to harmful bacteria. The formed products are thereafter stored in an environment which excludes harmful bacteria. The belt carrying the food products may be reversed in direction when the radiation from the source is interrupted. The food products are then deposited in a second receptacle and are discarded.

In this way, the food product is irradiated only once and thereafter shaped into the desired configuration. The system is also advantageous, particularly in processing meat, since it continuously moves meat through the sequential steps of leveling and irradiating the ground meat and subsequently forming the meat into hamburger patties, chubs and case ready products. The steps after the radiation of the meat are accomplished in an environment where the meat is not exposed to harmful bacteria.

DETAILED DESCRIPTION OF A PREFERRED EMBODIMENTS OF THE INVENTION

Figure 1:
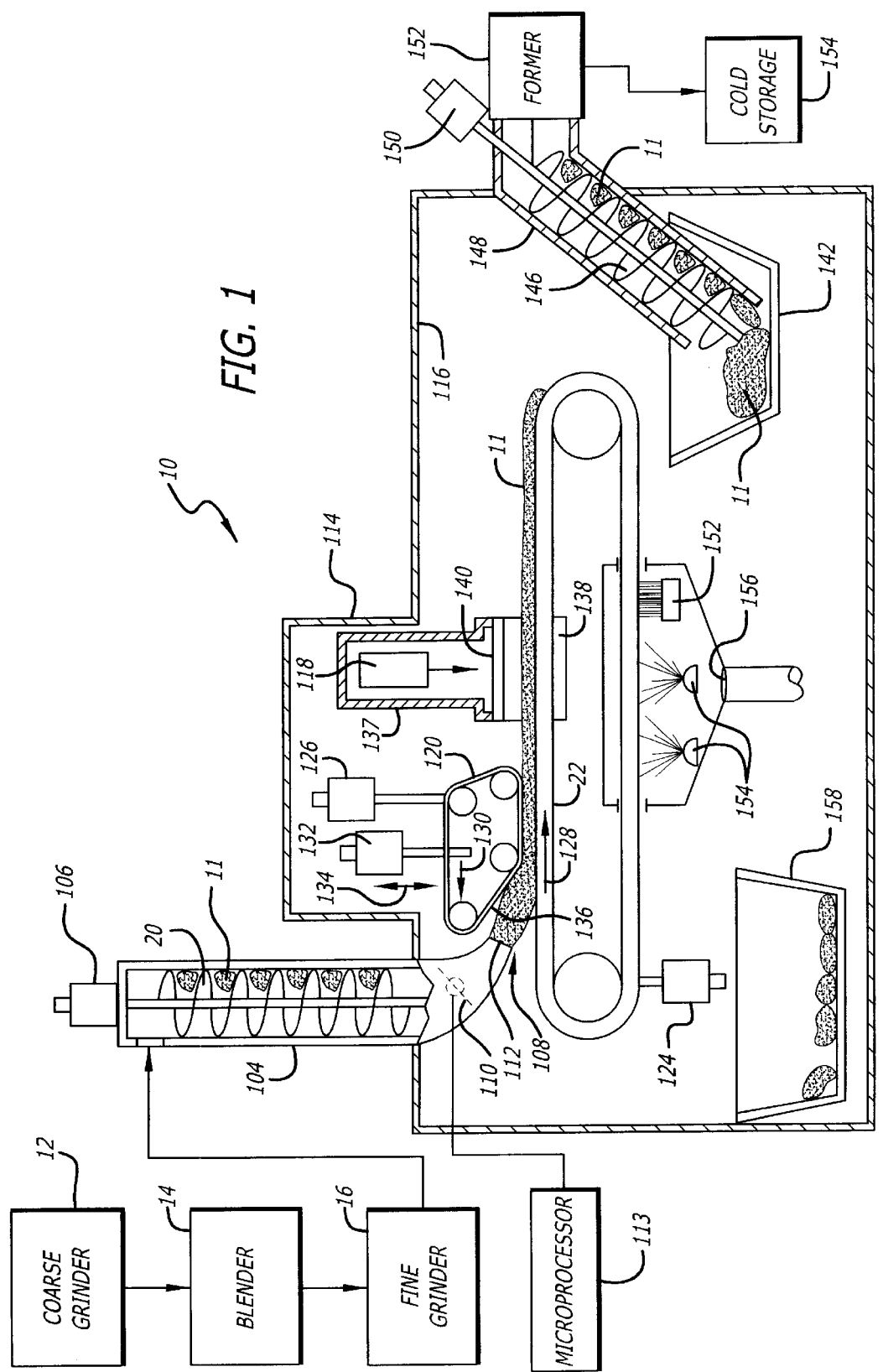
FIG. 1 is a schematic diagram of a preferred embodiment of the invention for irradiating a food product such as meat.

FIG. 1 shows a first preferred embodiment, generally indicated at 10, of a system for irradiating a product, particularly a food product, to destroy harmful bacteria in the product. For example, the product may be meat 11 from animal(s) such as cows, pigs and poultry. Applicants' system 10 is adapted to process meat at high speeds.

As a first step as indicated at 12, the meat 11 is coarsely ground. If it is desired to obtain a finer grinding, the meat 11 may be ground a second time. This is indicated at 14. Different grindings of meat may be blended as indicated at 16 after the meat has been coarsely ground and before the meat is finely ground. Alternatively, the meat may be blended and then ground. The meat 11 is then moved through a passage. The passage may be provided by an auger 20 in FIG. 1. The meat 11 passing through the auger 20 is continuous and is introduced to a transport member such as a belt 22 (FIG. 1) disposed in a closed loop. The meat 11 on the belt 22 may be provided in a continuous flow having irregular edges but relatively constant thickness. The belt 22 is moved at a speed dependent upon the radiation dosage to be provided to the meat 11. The radiation dosage applied to the meat 11 increases as the speed of the belt 22 is reduced. In like manner, the radiation dosage applied to the meat decreases as the speed of the belt 22 is increased.

The auger 20 is disposed in a housing 104 and is driven as by a motor 106 to introduce the mixed and blended ground meat 11 to a leveler generally indicated at 108. The speed of the auger 20 is dependent upon the speed of the belt 22. For example, the speed of the auger 20 decreases when the speed of the belt 22 is decreased. A valve 110 may be provided near the bottom of the auger 20 to regulate the flow of meat through an orifice 112 to the leveler 108. The valve 110 is provided with an orifice 112.

The orifice 112 provides an initial shaping of the meat passing to the belt 22. For example, the orifice 112 may be provided with a rectangular shape to provide an initial rectangular shaping of the meat on the belt 11. In this way, the movement of the meat 11 through the auger 20 is controlled so that the meat moves continuously through the auger without being backed up in the auger 20. The operation of the valve 110 and the speed of rotation of the auger 20 by the motor 106 may be controlled by a microprocessor 113 in FIGS. 1 and 3.

Figure 3:
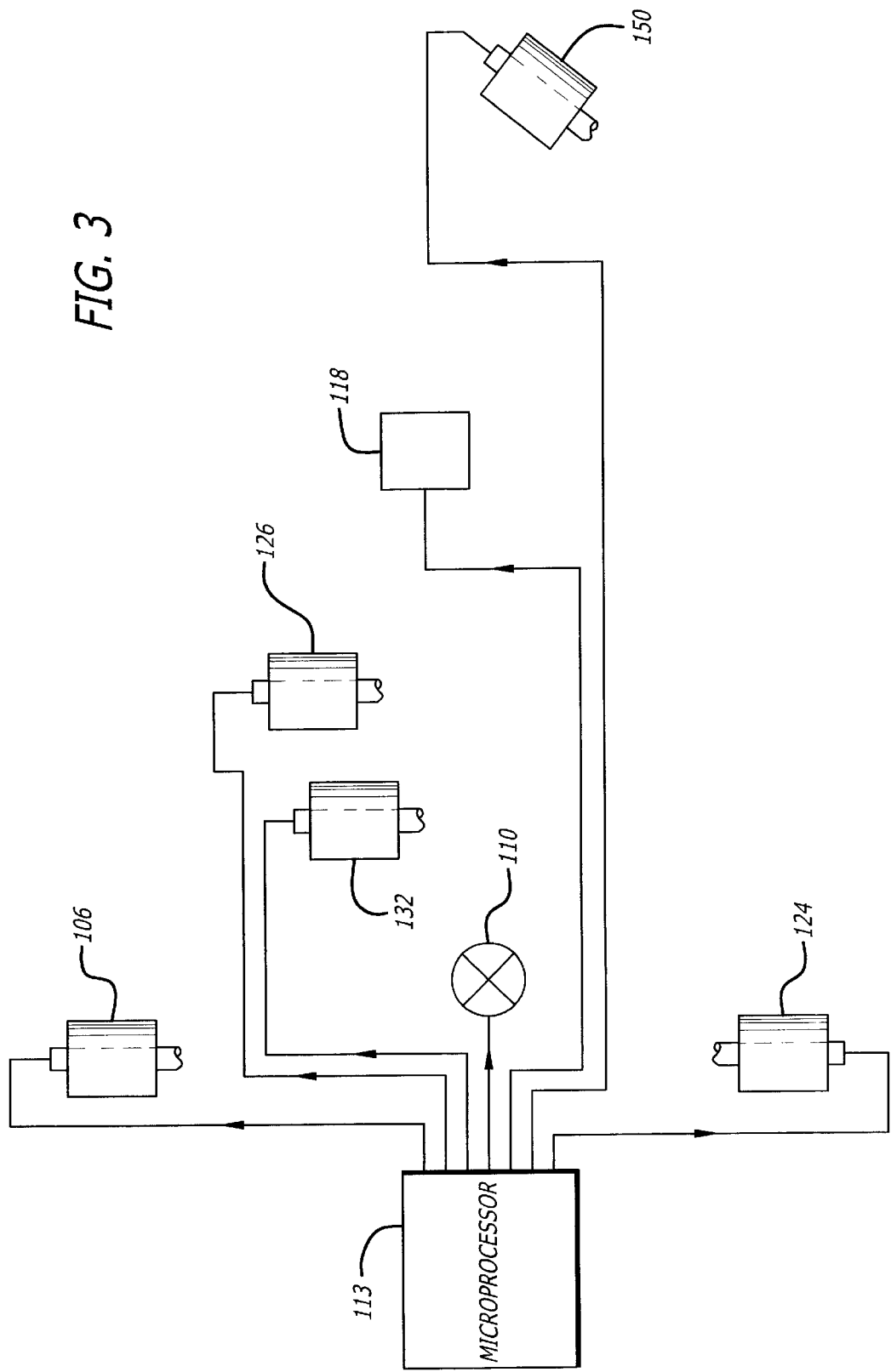
FIG. 3 is a simplified showing of the system shown in FIGS. 1 and 2 and shows the controls provided by a microprocessor in the system.

The leveler 108 is disposed in a chamber 114 which is preferably located below the surface of the earth. The walls of the chamber 114 may be formed from a radiation shielding material 116 which may illustratively constitute concrete or steel or a combination of concrete and steel in a conventional manner well known in the art. The radiation shielding material 116 prevents radiation in the chamber 114 from leaving the chamber. A source 118 of radiation is disposed within the chamber 114. The radiation from the source 118 may illustratively constitute gamma rays, an electron beam or x-rays. The operation of the source 118 is controlled by the microprocessor 113 as shown in FIG. 3.

The leveler 108 may include the belt 22 and a belt 120 each disposed in a closed loop and each movable in the closed loop. The belts 22 and 120 are respectively driven by motors 124 and 126. The operations of the motors 124 and 126 are controlled by the microprocessor 113 as shown in FIG. 3. As previously indicated, the belt 22 is moved at a speed dependent upon the radiation dosage to be provided in the meat. The belt 22 is normally driven by the motor 124 in a direction indicated by an arrow 128. The belt 120 is normally driven by the motor 126 in a direction indicated by an arrow 130.

The belt 120 is also movable by a motor 132 in a direction 134 substantially perpendicular to the directions 128 and 130 in which the belts 22 and 120 respectively move. As shown in FIG. 3, the operation of the motor 132 is controlled by the microprocessor 113. The adjustment in the positioning of the belt 120 in the direction 134 provides an adjustment in the thickness of the meat 11 which is moved on the belt 22 past the radiation source 118. Guides (not shown) may be provided on the belt 22 to control the width of the meat 11 on the belt.

The belt 120 is shaped at one end at an inclined angle as at 136 to provide a guide for progressively moving the meat 11 into the space between the belts 22 and 120. The meat 11 then moves into the space where the belts 22 and 120 are separated by the particular distance. This defines the particular thickness of the meat 11 as the meat moves past the radiation source 118. Radiation shielding material 137 may be provided at the opposite sides of the radiation source 118 to prevent radiation from reaching the belt 120 and from reaching members to the right of the radiation source. A beam stop 138 is disposed below the belt 120 at the position where the radiation from the source 118 passes through the belt. The beam stop 138 is known in the prior art. It limits the movement of the radiation from the source downwardly in FIG. 1.

A window 140 is disposed between the radiation source 118 and the belt 22 in spaced relationship to the belt 22. The window 140 may be made from a suitable material such as titanium. The window 140 passes the electron beam from the radiation source 118 to the meat 11. It also isolates the radiation source 118 physically from the meat 11 so that the meat cannot become splattered on the radiation source. The radiation shielding material 137 preferably extends to the window 140.

After being irradiated, the meat 11 on the belt 22 drops into a receptacle 142 and forms clumps in the receptacle. The clumps of the irradiated meat 11 in the receptacle 142 have at different positions an irregular thickness substantially all of which is greater than the particular thickness. The clumps of the irradiated meat in the receptacle 142 are continuous with one another.

A transport mechanism such as an auger 146 is disposed in a housing 148 and is driven by a motor 150. The operation of the motor 150 is controlled by the microprocessor 113 as shown in FIG. 3. The auger 146 lifts the irradiated meat 11 to a station where a former 152 operates on the meat to form any desired configuration such as hamburger patties, chubs and case ready items. The auger 146 and the former 152 may be constructed to isolate the meat 11 from the air. In this way, the irradiated meat 11 cannot be contaminated by harmful bacteria in the air. After being formed, the radiated meat 11 is introduced to a storage member 154 which retains the meat without exposing the meat to harmful bacteria. The storage member 154 may be refrigerated.

The belt 120 does not have to be cleaned before reaching the radiation from the source 118 since the meat 11 on the belt has not yet been irradiated. However, it may be a good idea to clean the belt 120 periodically. However, the belt 22 should be cleaned to remove any meat 11 on the belt after the belt has deposited the irradiated meat into the receptacle 142. This results from the fact that part of the belt 22 is in front of the radiation source 118 in the direction of movement of the belt and part of the belt 22 is past the radiation source in the direction of movement of the belt. Brushes 152 and sprays 154 may be provided to remove the meat 11 from the bottom portion of the belt as the bottom portion of the belt moves to the left in FIG. 1. A first one of the sprays 154 may be coarse and a second one of the sprays 154 may be fine. The meat 11 removed from the bottom portion of the belt 22 is directed to a drain 156.

The radiation from the source 118 or the movement of one or both of the belts 22 and 120 may occasionally be interrupted. When an interruption occurs in the operation of one of these members, the operation of the other ones of these members is simultaneously interrupted. The operation of the auger 20 is also interrupted at the same time and the valve 110 is closed at the same time. This prevents the meat from moving to the belt 22. When this occurs, all of the irradiated meat is directed to the receptacle 142. However, the unradiated meat 11 or the partially (but incompletely) radiated meat cannot be directed to the receptacle 142. The direction of movement of the belt 22 is reversed so that the belt moves in a counterclockwise direction in FIG. 1. The meat 11 is then directed to a receptacle 158 below the belt 22 at the left end of the belt in FIG. 1. It will be appreciated that the operation of the belts 22 and 120, the radiation source 118, the valve 110 and the augers 20 and 146 are controlled by the microprocessor 112, as shown schematically in FIG. 3. The operation of the auger 146 may also be controlled by the microprocessor 113.

Figure 2:
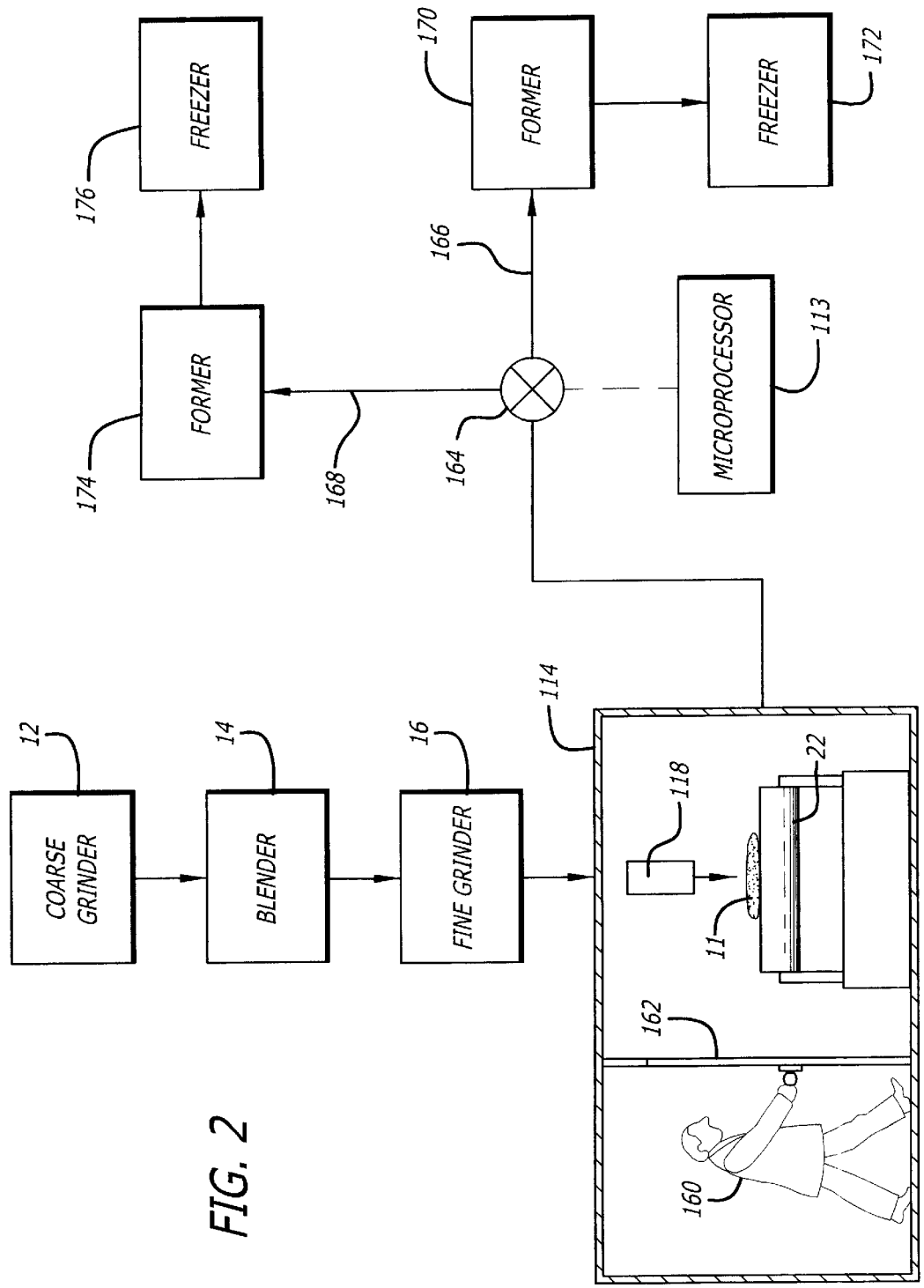
FIG. 2 is a schematic elevational view, partially in block form, showing the disposition, in a chamber providing shielding against radiation, of a portion of the system shown in FIG. 1.

FIG. 2 schematically shows the disposition of the chamber 114 below the surface of the earth. An operator 160 is schematically shown entering into the chamber 114 through a door 162 to inspect the system in the chamber or to adjust the operation of the system in the chamber. The meat 11 irradiated by the radiation source 118 in the chamber 114 is introduced to a valve 164 which may be controlled as by the microprocessor 113 to introduce the meat to a conveyor system 166 or a conveyor system 168. Illustratively, the conveyor system 166 may introduce the meat 11 to a former 170 which forms the meat into hamburger patties and introduces the hamburger patties to a storage member such as a refrigerator or freezer 172. Also illustratively, the conveyor system 168 may introduce the meat 11 to a former 174 which forms the meat into chubs and introduces the chubs to a storage member such as a freezer 176.

The system shown in FIGS. 1 and 2 has certain important advantages. It provides initially for a leveling of the meat which has been ground and blended and then it provides for an irradiation of the meat by a single source 118 of radiation after the meat has been leveled. Furthermore, the forming and packaging of the meat occur only after the meat has been irradiated. In this way, all of the different steps can be accomplished in a single conveyor system. This is contrary to the prior art where the forming occurs before the irradiation and where separate conveyors are used to provide the radiation for articles of different configurations. For example, individual and separate conveyors are provided in the prior art to form hamburger patties, chubs and case ready products and a separate radiation source is provided in the prior art for each individual one of the different conveyors. Radiation sources are expensive.

As will be appreciated, only a single source of radiation 118 has to be provided in the system shown in FIGS. 1 and 2 and described above. Only a single source 118 of radiation is provided because the thickness of the meat moving past the radiation source 118 is sufficiently small so that the meat can be properly irradiated from only one side of the meat. For example, the thickness of the meat moving past the radiation source 118 may be approximately one and one half inches (1½"). However, if the thickness of the meat is increased, the meat may have to be irradiated from the opposite sides of the meat. This can be accomplished in a single pass by disposing the radiation source 118 on a first side of the leveled meat 11 and by disposing a substantially identical radiation source on the opposite side of the leveled meat. The radiation of meat from opposite sides of the meat is known in the prior art.

Figure 4:
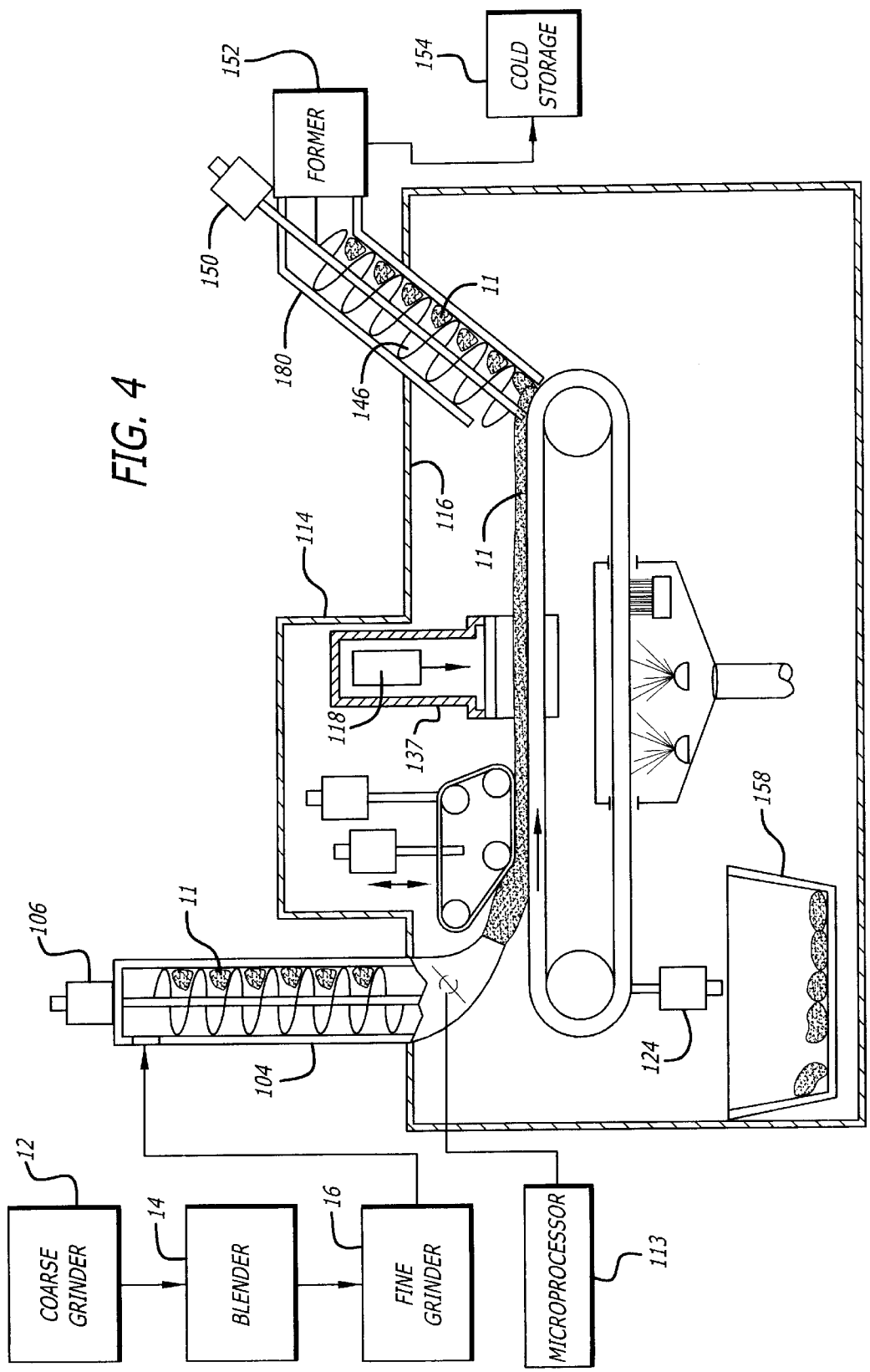
FIG. 4 is a schematic diagram similar to that shown in FIG. 1 and shows a modification of a portion of the preferred embodiment of the system shown in FIG. 1.

FIG. 4 shows an arrangement in which the meat 11 on the belt 22 is transferred directly to auger 146. This eliminates the receptacle 142 in FIG. 1. As will be seen in FIG. 3, the speed of the auger 146 may be regulated by the microprocessor 113 so that the meat will flow continuously through the auger and so that the meat will not be backed up at the orifice to the auger. From the standpoint of the claims, the auger 148 in FIG. 4 can be considered as a receptacle equivalent to the receptacle 142 in FIG. 1 for receiving the meat 11 after the meat has been irradiated.

Although this invention has been disclosed and illustrated with reference to particular preferred embodiments, the principles involved are susceptible for use in numerous other embodiments which will be apparent to persons of ordinary skill in the art. The invention is, therefore, to be limited only as indicated by the scope of the appended claims.

What is claimed is:

1. A system for irradiating food products including,
    a device for providing ground food products,
    a leveler for providing the ground food products with a particular thickness,
    a radiation source for irradiating the ground food products having the particular thickness,
    a receptacle for receiving the irradiated food products, and
    a former for providing the irradiated food products from the receptacle in a particular configuration.

2. A system as set forth in claim 1, including,
    the former being disposed to prevent the food products from being exposed to harmful bacteria.

3. A system as set forth in claim 1 wherein
    the leveler, the radiation source and the receptacle are disposed in a chamber having walls formed from a radiation shielding material.

4. A system as set forth in claim 1, including,
    a mechanism for moving the irradiated food products from the receptacle to the former without exposing the irradiated food products to harmful bacteria, the former being disposed in an environment for providing the food products in a particular configuration without exposing the food products to harmful bacteria.

5. A system as set forth in claim 4, including,
a storage unit for receiving the food products from the former and for storing the formed food products without exposing the formed food products to harmful bacteria.

6. A system as set forth in claim 1 wherein
the leveler includes a pair of members spaced from each other, and movable relative to each other, to receive the ground food products in the space between the movable members for progressively reducing the thickness of the ground food products to the particular thickness.

7. A system as set forth claim in claim 2 wherein
the leveler, the radiation source and the receptacle are disposed in a chamber having walls defined by radiation receiving material and wherein
the leveler includes a pair of members spaced from each other, and movable relative to each other, to receive the ground food products in the space between the movable members for progressively reducing the thickness of the ground food products to the particular thickness.

8. A system as set forth in claim 7, including,
a mechanism for moving the irradiated food products from the receptacle to the former without exposing the irradiated food products to harmful bacteria,
the former being disposed in an environment for forming the food products without exposing the food products to harmful bacteria, and
a storage unit for receiving the food products from the former and for storing the formed food products without exposing the formed food products to harmful bacteria.

9. A system as set forth in claim 1, including
the device being operative to provide the ground food products at a particular rate, and
a valve variable in operation in accordance with the rate at which the food products are provided by the device.

10. In a system for irradiating food products,
first and second members spaced from each other by a particular distance to provide the food products with a particular thickness,
the second member being movable relative to the first member,
a transport mechanism for introducing food products into the space between the members,
a source of radiation for irradiating the food products moved into the space between the members,
a receptacle for receiving the food products irradiated in the space between the members and moved by the second movable member past the radiation source, and
a valve for introducing the food products to the first and second movable members, the valve being controllable in accordance with the rate at which the food products are introduced to the first and second movable members.

11. In a system as set forth in claim 10,
apparatus for facilitating the removal of the food products from the second movable member after the movement of the second movable member to the receptacle.

12. In a system as set forth in claim 11 wherein
the ground food products are moved by the second movable member past the source of radiation and wherein
the removing apparatus includes a member for operating on the second movable member to remove the food products from the second movable member and wherein
the second movable member includes a belt movable in a closed loop.

13. In a system as set forth in claim 10,
a first drive member for displacing the first member relative to the second member in a direction to adjust the spacing between the members to the particular distance,
a second drive member for driving the second member in a direction for moving the food products past the radiation source for an irradiation of the food products, and
a third drive member for driving the first member in a direction relative to the first member to facilitate the movement of the food products past the radiation source.

14. In a system as set forth in claim 10,
a plate disposed relative to the source of radiation to isolate the source of radiation physically from the ground food products on the second member and to pass the radiation from the radiation source to the ground food products on the second member.

15. In a system as set forth in claim 10,
a beam stop disposed on the opposite side of the second member from the radiation source to limit the movement of the radiation from the source.

16. In a system as set forth in claim 10,
the second member being movable in a first direction past the radiation source to obtain an irradiation of the food products by the radiation source,
the second member being movable in a second direction opposite to the first direction upon an interruption in the operation of the source of radiation, and
a second receptacle disposed relative to the radiation source to receive the food products on the second member when the second member is moved in the second direction.

17. In a system as set forth in claim 16,
a microprocessor responsive to the operation of the transport mechanism for adjusting the valve to provide for a continuous movement of the food product on the second member past the source of radiation in the first direction and responsive to an interruption in the radiation from the source for providing for a movement of the second member in the second direction.

18. In a system as set forth in claim 10 wherein
the first and second members and the first and second receptacles are disposed in a chamber having walls defined by a radiation shielding material.

19. In a system as set forth in claim 11 wherein
the removing apparatus includes at least one of a guide and a sprayer for operating on the second movable member and wherein
the second member includes a belt disposed and movable in a closed loop and wherein
a first drive mechanism is provided for displacing the first member relative to the second member in a direction to adjust the spacing between the members to the particular distance and wherein
a second drive member is provided for driving the first member in a direction for facilitating the movement of the food products past the radiation source and wherein a third drive member is provided for driving the second member in a direction for moving the food products past the radiation source and to the first receptacle and wherein
    a plate is disposed relative to the source of radiation to isolate the source of radiation physically from the food products and to pass the radiation from the radiation source to the food products and wherein
        the first and second members and the receptacle are disposed in a chamber having walls defined by a radiation shielding material.

20. A system for irradiating food products, including a chamber having walls defined by radiation-shielding material, a leveler disposed in the chamber for receiving the food products and for leveling the thickness of the food products, and a source of radiation disposed in the chamber for irradiating the food products after the food products have been leveled, a first transport mechanism for moving the food products to the leveler, a second transport mechanism for moving the irradiated food products from the chamber without exporting the irradiated food product to harmful bacteria, and a former for providing the irradiated food products with a particular configuration.

21. A system as set forth in claim 20, including a mixer and grinder for processing the food products before the food products are leveled, a valve having a variable operation is provided for passing the food products from the first transport mechanism to the leveler, and a microprocessor is provided for varying the operation of the valve in accordance with the rate at which the food products are passing from the first transport mechanism to the valve, thereby to provide for a continuous movement of the food products to the source of radiation.

22. A system as set forth in claim 20, including the second transport mechanism and the former being respectively disposed relative to each other and operative to transport and configure the irradiated food products without exposing the food products to harmful bacteria.

23. A system as set forth in claim 20 wherein the leveler is adjustable to vary the thickness of the food products that are irradiated.

24. A system as set forth in claim 22 wherein the leveler is adjustable to vary the thickness of the food products that are irradiated and wherein a receptacle is provided for receiving the irradiated food products without exposing the irradiated food products to harmful bacteria and wherein the second transport mechanism is disposed relative to the receptacle and is constructed to transport the irradiated food products to the former without exposing the irradiated food products to harmful bacteria.

25. A system as set forth in claim 20, including, a storage member for storing the food products configured by the former.

26. A system as set forth in claim 20, including, a storage member for storing the food products configured by the former, a second receptacle, and a microprocessor responsive to an interruption in the supply of radiation from the source to move the second member in a direction for reversing the direction of movement of the second member to obtain a deposit of the food products in the second receptacle.

27. A system for irradiating food products, including a supply mechanism for continually providing a replenished supply of food products, a leveler for receiving the continually replenished food products from the supply mechanism and for providing the food products with a particular thickness, a source of radiation, the leveler including a first member for moving the food products with the particular thickness past the source of radiation to obtain an irradiation of the food products, an accumulator for the irradiated food products, and a former for providing the accumulated irradiated food products to any particular configuration.

28. A system as set forth in claim 27 wherein the source of radiation, the transport mechanism and the accumulator are disposed in a chamber providing shielding from radiation and wherein the former is disposed out of the chamber and wherein a second transport mechanism is provided for moving the accumulated irradiated food products from the accumulator in the chamber to the former outside of the chamber.

29. A system as set forth in claim 27 wherein the second transport mechanism and the former are disposed in an environment free of harmful bacteria and wherein the articles provided by the former are disposed in a storage member free of harmful bacteria.

30. A system as set forth in claim 27 wherein the leveler is adjustable in a direction to vary the particular thickness and wherein a plate is disposed between the source of radiation and the accumulated food products to isolate the source of radiation physically from the accumulated food products and to pass the radiation from the source to the accumulated food products.

31. A system as set forth in claim 27 wherein the leveler includes the first member and a second member each movable in a closed loop and wherein the first and second members are disposed and configured relative to each other to progressively decrease the spacing between them to a distance corresponding to the particular thickness.

32. A system as set forth in claim 27 wherein the supply mechanism includes a valve having a variable orifice and wherein a microcomputer is responsive to the rate of movement of the food products by the supply mechanism for varying the orifice to provide for the continuous movement of the food products to the leveler without constipating the valve.

* * * * *